Aug. 3, 1937.  J. GALAMB ET AL  2,088,784
AUTOMOBILE SEAT ADJUSTING DEVICE
Filed June 9, 1936  2 Sheets-Sheet 1
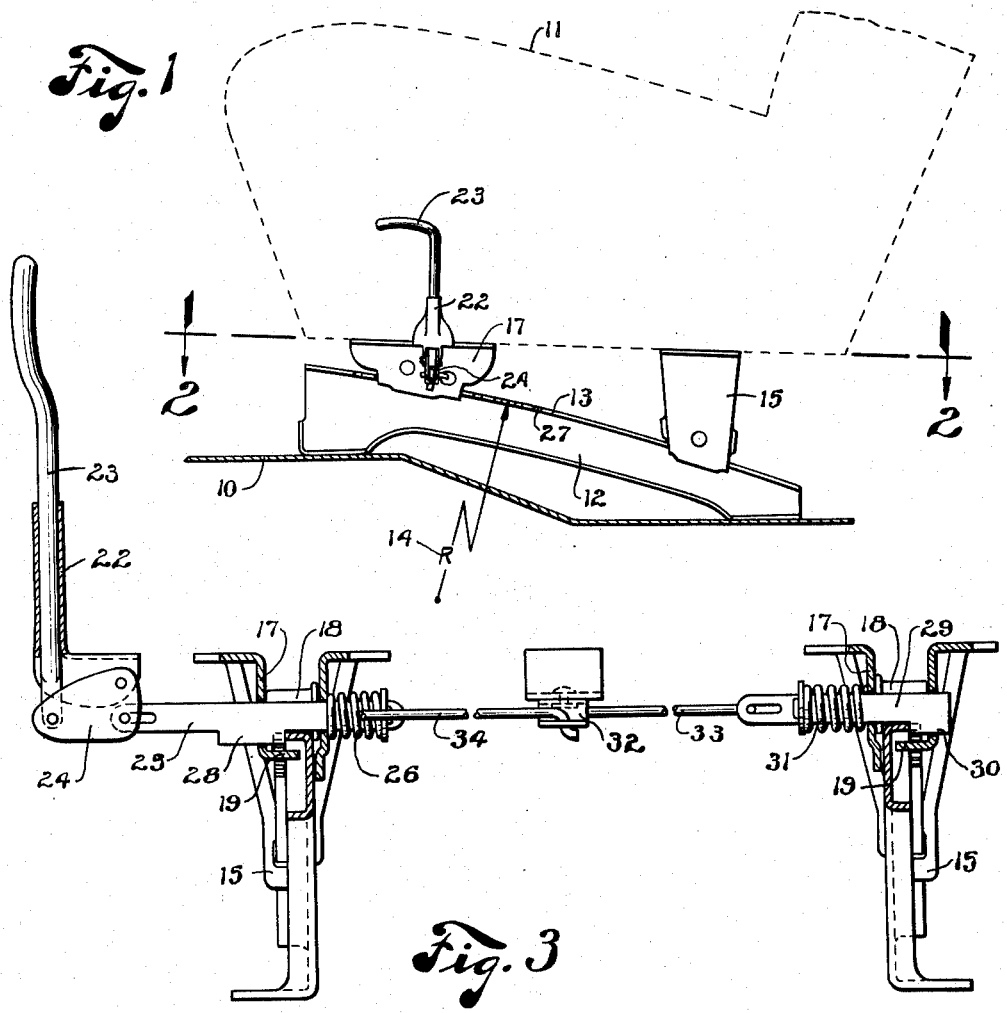

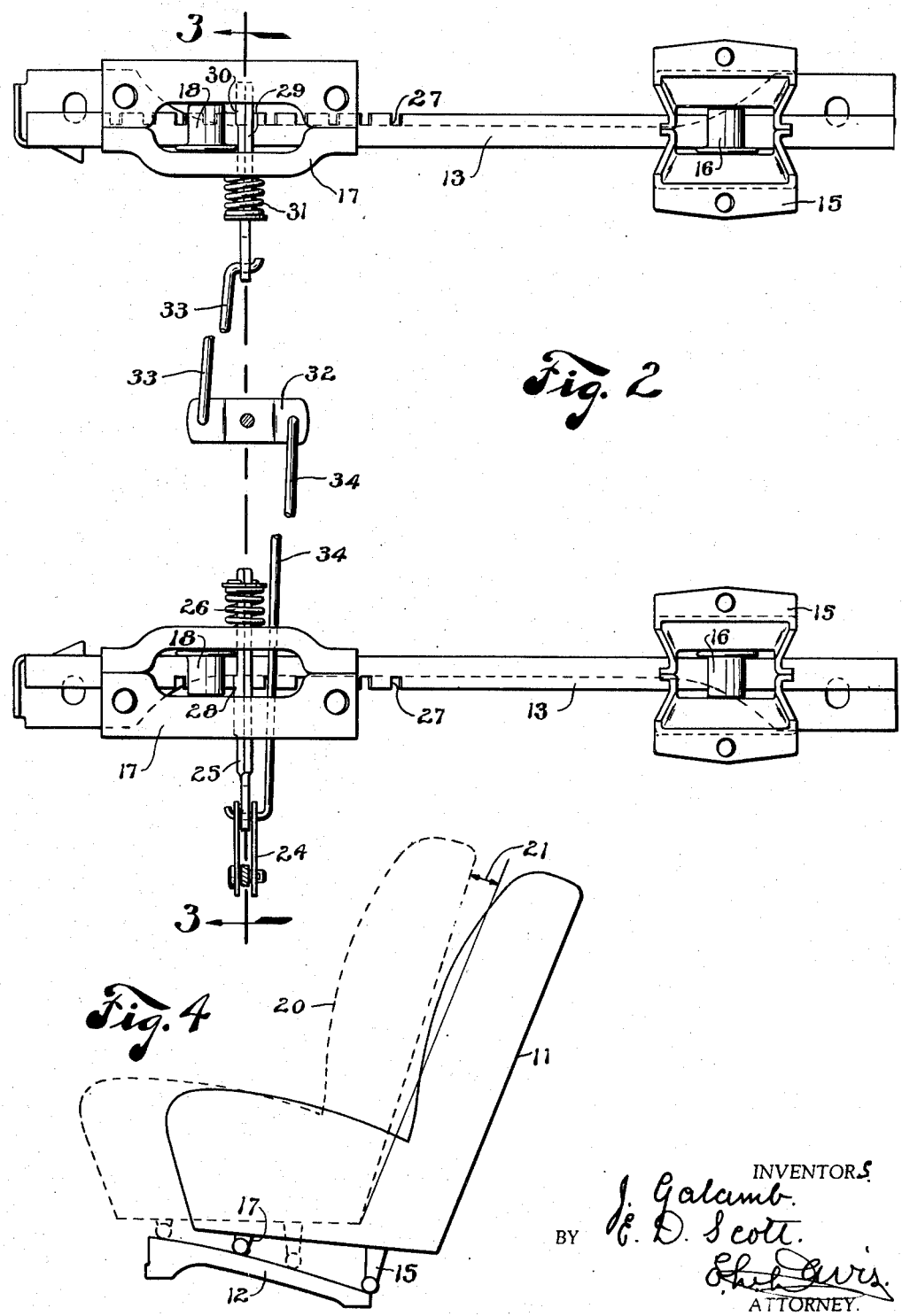

Patented Aug. 3, 1937

2,088,784

UNITED STATES PATENT OFFICE 2,088,784

AUTOMOBILE SEAT ADJUSTING DEVICE

Joseph Galamb and Edwin D. Scott, Detroit, Mich., assignors to Ford Motor Company, Dearborn, Mich., a corporation of Delaware Application June 9, 1936, Serial No. 84,328

2 Claims. (Cl. 155—14)

The object of our invention is to provide an automobile seat adjuster especially adapted for use in connection with the front seat of an automobile, which device may be readily adjusted by the driver of the vehicle both as to height and for longitudinal position in the car.

In automotive vehicles it is desirable that the driver's seat be capable of adjustment at least in a fore and aft direction so that the driver of the car may adjust the seat to a comfortable position in relation to the control pedals and steering wheel. The seat should also be adjustable in a vertical direction so that drivers of less height may sit higher in the car so as to give adequate vision over the cowl of the car. With our improved seat construction these two adjustments are made simultaneously.

Still a further object of our invention is to provide means for adjusting the seat not only longitudinally and vertically but also simultaneously changing the angle of the seat back so that the back is more nearly vertical when the seat is adjusted to its forward position. The modern automobiles with low roof and high cowl lines are particularly benefited by this construction. The conventional automobile seat may be adjusted only vertically and longitudinally and consequently, must be lowered excessively to accommodate a tall person. The applicants rock the seat back rearwardly so that greater head clearance is obtained without excessively lowering the seat. It is believed that this method of adjusting the seat gives greater comfort with increased visibility for both tall and short drivers than seat constructions heretofore employed.

Specifically our invention consists in moving the seat upwardly and forwardly in an arcuate path whereby the upper edge of the seat back moves forwardly a greater distance than the lower portion thereof.

Still a further object of this invention is to provide means for holding the seat in any of its adjusted positions which means may not rattle or vibrate when the car is in motion. This anti-rattle construction is particularly advantageous where the passenger's seat along side the driver is made independently adjustable. In all former constructions such seats rattled when they were not occupied and the car was in operation. The applicants' adjusting device is designed to overcome this disadvantage.

With these and other objects in view, our invention consists in the arrangement, construction and combination of the various parts of our improved device, as described in the specification, claimed in the claims and illustrated in the accompanying drawings, in which:

Figure 1 is a side elevation of our improved seat adjustment when applied to the front seat of an automobile.

Figure 2 is a plan view of the seat operating mechanism, taken on line 2—2 of Figure 1.

Figure 3 is a sectional view, taken on the line 3—3 of Figure 2, and

Figure 4 is a diagrammatic view, illustrating the two extreme positions of adjustment of our device in order to bring out the change in the angle of the seat back for these two positions.

Referring to the accompanying drawings, we have used the reference numeral 10 to indicate the floor of an automobile. The front portion of this floor is raised higher than the rear portion, inasmuch as the height of the front portion of the floor is usually controlled by the top of the frame cross members while the portion of the floor to the rear of the front seat may be dropped down between the cross members.

The seat construction, per se, forms no part of our invention, it being given the reference numeral 11 and being shown by dotted lines in Figure 1. Our improved seat adjustment is adapted to be fastened to the bottom of the seat in a manner similar to that employed in the conventional automobile. We have provided a pair of tracks 12, which are stamped from sheet metal, these tracks being placed near the respective ends of the seat 11. One end of each of the tracks is placed upon the raised portion of the floor 10 while the other end is secured to the lower portion of the floor. Each of the tracks 12 is provided with a flange 13 on its upper edge, which flange is formed on an arc having a radius as shown at 14 in Figure 1. Both of the tracks 12 extend horizontally relative to the vehicle chassis.

Projecting downwardly from the rear portion of the ends of the seat 11, we have provided brackets 15 which are each formed from two sheet metal halves and which bracket is provided with a roller 16 rotatably mounted therein, this roller being adapted to roll upon the adjacent flange 13. The upper portion of each bracket 15 is securely fastened to the underside of the seat 11.

The front portion of the seat 11 is supported upon two brackets 17 somewhat similar to the brackets 15. Each bracket 17 is secured to the underside of the forward portion of the seat 11, and each extends downwardly to the flange 13 where a roller 18 is rotatably mounted therein so as to roll against the flange 13. It will be noted from Figure 3 that an ear 19 is turned inwardly from the bottom portion of the bracket 17 so as to extend beneath the flange 13. While this ear 19 does not ordinarily coact with the flange, it is provided so that if the seat should be lifted bodily, the ears 19 would prevent the removal of the seat. The lower portion of the bracket 15 is also provided with a similar ear turned inwardly underneath the outer edge of the flange 13 to prevent lifting of the rear brackets 15.

From the foregoing, it will be seen that the seat may be moved rearwardly to the position shown in solid lines in Figure 4, at which time the back of the seat will be tilted rearwardly to a considerable extent. The seat may then be moved forwardly to the position shown by dotted lines 20 in Figure 4, in which case the seat will be raised and the back portion will be straighter than in the former mentioned position. The difference in the angle of the seat back is shown by angle 21 in Figure 4. It may be desirable, with certain adaptations of this construction, to provide a curve of one radius at one end of the track and a different radius at the other end, thus allowing the front edge of the seat to be raised at a desired rate independently of the rate of the rear portion.

We have provided means for holding the seat in a plurality of adjusted positions, which means comprises a bracket 22 which is fastened to one end of the seat 11 and in which bracket an operative handle 23 is mounted to reciprocate in a vertical position. The upper end of the handle 23 is bent over so as to be readily gripped by the operator, while the lower end is pivotally secured to a pair of bell crank plates 24, the latter being pivotally secured to the lower portion of the bracket 22. The plates 24 are also pivotally secured to a bar 25 which is adapted to reciprocate through suitable slots in the adjacent bracket 17 in position just above the flange 13. The inner end of the bar 25 is provided with a compression spring 26 which urges the bar towards the center of the car. It will be noted that the forward half of the flange 13 is provided with a plurality of notches 27 therein and the bar 25 is provided with a dog 28 extending downwardly therefrom which is adapted to coact with these notches. The spring 26 resiliently urges the bar to position where the dog 28 bears either against the edge of the flange 13 or enters one of the notches 27.

The bracket 17 which is positioned at the other end of the seat is provided with a bar 29 reciprocally mounted transversely therethrough in position above the flange 13 and which bar is provided with a dog 30 formed integrally therewith which is adapted to be resiliently urged into the notches 27 of the adjacent flange 13 by means of a compression spring 31. It will be noted that both the springs 31 are positioned between the seat tracks 12 and that these springs resiliently urge the bars 29 inwardly so that the seat is resiliently clamped upon the tracks by means of the two dogs 28 and 30 being urged toward each other.

As shown in Figures 2 and 3, we have pivotally mounted a beam 32 to the center portion of the seat 11, one end of which beam is pivotally connected to the bar 29 by means of a compression rod 33 while the opposite end of the beam 32 is connected to bell crank plates 24 by means of a tension rod 34. The rod 33 is connected to the bar 29 through a slotted connection while the bar 25 is connected with the bell crank 24 through a similar slotted connection.

The springs 26 and 31 resiliently clamp the brackets 17 to the seat tracks so as to prevent rattling of the seat upon the tracks. When the handle 23 is raised, the plates 24 oscillate to thereby simultaneously pull the rod 34 together with the bar 25. The dog 28 is thereby drawn out of the notch in the adjacent flange 13, the rod 33 pushing the bar 29 so that the dog 30 is likewise moved out of engagement with the adjacent notches in the seat track. The seat may now be rolled upwardly or rearwardly upon the seat tracks. When it has reached its desirable position, the handle 23 is released and the seat moved slightly until one of the dogs 28 or 30 enters one of the notches in the seat tracks. Due to the slotted connections at the end of each of the bars, the dogs may individually enter their respective notches so that first one dog may enter the notch and then the seat moved slightly so that the other dog may enter it. In former seat constructions, these dogs were made to operate simultaneously and a great difficulty was experienced in aligning the seat so that both dogs would simultaneously become aligned with the notches.

Among the many advantages arising from the use of our improved seat construction, it may be well to mention that the seat is adjustable not only forwardly and longitudinally but also vertically and what is more important the angle of the back of the seat is changed as the seat is adjusted so that the seat is straighter when adjusted to its forward position than when adjusted to the rearward position. This advantage is extremely important in connection with cars wherein the cowls are quite high with the roof of the car lowered to permit only a minimum head-room clearance. Heretofore when the seat was lowered to the position where a tall person would have sufficient head room, it was too low for convenient operation of the controls. If the seat back were tilted initially to give the desired seat height and head room, then the seat would need be raised too high to operate the controls when the desired visibility was obtained for short people. In the applicants' device, the seat portion is raised very little to thereby not seriously change the position of the driver relative to the controls but the back of the seat is changed so that a shorter person will be in a better position to see over the cowl while a taller person will lean back further to give greater head-room clearance. This desirable condition is obtained because of the arcuate shape of the track which arcuate shaped tracks are believed to be new in the automobile art.

Some changes may be made in the arrangement, construction and combination of the various parts of our improved device without departing from the spirit of our invention and it is our intention to cover by our claims such changes as may be reasonably included within the scope thereof.

We claim as our invention:

1. An adjustable seat construction for automotive vehicles comprising, a pair of longitudinally extending sheet metal seat tracks fixed to the floor of said vehicle, the upper edge of each track having a laterally extending flange formed thereon with the forward end of each track positioned above its rearward end thereof, the edges of said laterally extending flanges having a plurality of notches therein, a seat, a pair of brackets extending downwardly from each end of said seat and coacting with said tracks, whereby said seat may be moved forwardly and rearwardly upon said tracks, a bar mounted for transverse reciprocation in the forward bracket of each of said pairs of the brackets, each of said bars having a dog thereon which is adapted to enter the notches in the adjacent laterally extending flange to thereby prevent longitudinal movement of said seat on said seat tracks, a spring disposed between each of said bars and the adjacent bracket, which springs resiliently urge said bars into said notches, an operative lever mounted upon said seat, means for simultaneously actuating both of said bars against the pressure of said springs by means of said lever, said actuating means being connected to each of said bars through a pin and slot connection so that upon movement of said lever in one direction said bars will both be positively moved against the force of said springs and upon the movement of said lever in the opposite direction said springs will independently urge said bars into their engaged positions.

2. An adjustable seat construction for automotive vehicles comprising, a pair of longitudinally extending sheet metal seat tracks fixed to the floor of said vehicle, the upper edge of each of said tracks having an outwardly extending flange formed thereon, with the forward end of each track positioned above its rearward end, the outer edges of each of said flanges having a plurality of notches therein, a seat, a pair of brackets extending downwardly from each end of said seat, each of said pairs of brackets coacting with one of said tracks so as to support said seat for reciprocal movement fore and aft in the vehicle, a bar reciprocally mounted transversely through each forward bracket of said pairs of brackets, said bars each having a dog thereon which coacts with the notches in said flanges to secure each end of said seat against longitudinal movement, a compression spring extending between one end of each of said bars and the adjacent bracket, said springs resiliently urging said dogs into their engaged positions, a handle mounted on one end of said seat so as to move in a vertical direction, means for connecting said handle with each of said bars through pin and slot connections whereby an upward movement of said handle will positively move both of said bars against their respective spring pressures to their disengaged positions, said pin and slot connections permitting either or both of said bars to remain in their disengaged positions after said handle has been returned to its lowermost position.

JOSEPH GALAMB.
EDWIN D. SCOTT.